(12) United States Patent
Ide et al.

(10) Patent No.: US 11,331,808 B2
(45) Date of Patent: May 17, 2022

(54) ROBOT

(71) Applicant: FUJITSU LIMITED, Kawasaki (JP)

(72) Inventors: Masaru Ide, Setagaya (JP); Shinji Kanda, Fujisawa (JP); Toshikazu Kanaoka, Kawasaki (JP); Kaoru Kinoshita, Kita (JP)

(73) Assignee: FUJITSU LIMITED, Kawasaki (JP)

( * ) Notice: Subject to any disclaimer, the term of this patent is extended or adjusted under 35 U.S.C. 154(b) by 390 days.

(21) Appl. No.: 16/169,113

(22) Filed: Oct. 24, 2018

(65) Prior Publication Data
US 2019/0054626 A1    Feb. 21, 2019

Related U.S. Application Data

(63) Continuation of application No. PCT/JP2016/063438, filed on Apr. 28, 2016.

(51) Int. Cl.
| | | |
|---|---|---|
| *G05B 15/00* | (2006.01) | |
| *G05B 19/00* | (2006.01) | |
| *B25J 11/00* | (2006.01) | |
| *B25J 9/16* | (2006.01) | |
| *B25J 19/02* | (2006.01) | |

(52) U.S. Cl.
CPC ........... *B25J 11/001* (2013.01); *B25J 9/1669* (2013.01); *B25J 11/0005* (2013.01); *B25J 19/023* (2013.01); *B25J 19/026* (2013.01)

(58) Field of Classification Search
CPC .... B25J 11/0005; B25J 11/001; B25J 19/023; B25J 19/026; B25J 9/1669; B25J 13/00
See application file for complete search history.

(56) References Cited

U.S. PATENT DOCUMENTS

| | | | |
|---|---|---|---|
| 2003/0019671 A1 | 1/2003 | Inoue et al. | |
| 2003/0078696 A1* | 4/2003 | Sakamoto | A63H 3/52 |
| | | | 700/245 |
| 2006/0184273 A1* | 8/2006 | Sawada | G06N 3/008 |
| | | | 700/245 |

(Continued)

FOREIGN PATENT DOCUMENTS

| | | |
|---|---|---|
| EP | 0716866 A1 | 6/1996 |
| JP | S63-160900 U | 10/1988 |

(Continued)

OTHER PUBLICATIONS

JPOA—Office Action of Japanese Patent Application No. 2018-514070 dated Feb. 4, 2020, with English translation.

(Continued)

*Primary Examiner* — Harry Y Oh
(74) *Attorney, Agent, or Firm* — Fujitsu Patent Center

(57) ABSTRACT

A robot for performing an expression by a non-verbal reaction, includes a body including a lower part provided so as to be capable of panning and tilting with respect to a support point coupled to a placement surface; a pair of arms provided to side parts of the body so as to be capable of moving up and down; and a head provided to an upper part of the body so as to be capable of panning and tilting, wherein the non-verbal reaction includes a combination of the tilting and the panning of the body with respect to the support point and movement of the pair of arms or the head or any combination thereof.

13 Claims, 19 Drawing Sheets

(56) References Cited

U.S. PATENT DOCUMENTS

| | | | | |
|---|---|---|---|---|
| 2012/0197464 | A1* | 8/2012 | Wang | B25J 5/00 701/2 |
| 2013/0123987 | A1* | 5/2013 | Kase | A63H 30/04 700/259 |
| 2013/0218339 | A1* | 8/2013 | Maisonnier | B25J 13/003 700/257 |
| 2015/0100157 | A1* | 4/2015 | Houssin | G10L 15/19 700/246 |
| 2015/0183112 | A1 | 7/2015 | Song et al. | |
| 2016/0121487 | A1* | 5/2016 | Mohan | H04L 67/34 700/248 |
| 2016/0188977 | A1* | 6/2016 | Kearns | G05D 1/0274 348/113 |
| 2017/0100842 | A1* | 4/2017 | Le Borgne | B25J 9/1694 |

FOREIGN PATENT DOCUMENTS

| | | |
|---|---|---|
| JP | H07-222873 A | 8/1995 |
| JP | 2001-25984 A | 1/2001 |
| JP | 2002-154081 A | 5/2002 |
| JP | 2003-266350 | 9/2003 |
| JP | 2004-160630 A | 6/2004 |
| JP | 2005-335001 | 12/2005 |
| JP | 2006-247780 | 9/2006 |
| JP | 2007-125629 A | 5/2007 |
| JP | 2013-151045 A | 8/2013 |
| JP | 2013-237124 | 11/2013 |
| JP | 2014-115897 A | 6/2014 |
| JP | 3192150 U | 7/2014 |
| JP | 2016101441 A * | 6/2016 |

OTHER PUBLICATIONS

Robot information WEB magazine, "ComU (Co)" and "Sota (Sorter)", robot start company, Feb. 3, 2015, third moving image, and moving image 0:58/4:19-near1:23/4:19,2:25/4:19, URL,https://robotstart.info/2015/02/03/news048.html.

JPOA—Office Action of Japanese Patent Application No. 2018-514070 dated Sep. 10, 2019 with machine tanslation.

International Search Report and Written Opinion of the International Searching Authority (Form PCT/ISA/210, 220, Form PCT/ISA/237), mailed in connection with PCT/JP2016/063438 and dated Jun. 28, 2016 (11 pages).

Trovato, G et al., "Cross-cultural study on human-robot greeting interaction: acceptance and discomfort by Egyptians and Japanese", Paladyn, Journal of Behavioral Robotics, vol. 4, No. 2, Aug. 27, 2013 (Aug. 27, 2013), XP55562073, 12 pages.

Gabriele Trovato et al., "A Novel Culture-Dependent Gesture Selection System for a Humanoid Robot Performing Greeting Interaction", Oct. 27, 2014 (Oct. 27, 2014), International Conference on Social Robotics (ICSR 2814), XP47302070, pp. 340-349.

EESR—Extended European Search Report of European Patent Application No. 16900490.0 dated Mar. 8, 2019.

CNOA—Office Action of Chinese Patent Application No. 201680084882.1 dated Feb. 2, 2021 with English Translation.

CNOA—Second Office Action of Chinese Patent Application No. 201680084882.1 dated Jul. 23, 2021 with English Translation.

Course material: "Introduction to Robotics"(Vikram Kapila)—Mar. 2, 2015, Published by the Tandon School of Engineering of the New York University, 49 pages, XP55842568, retrieved from internet on Sep. 20, 2021.

EPOA—Official Communication of European Patent Application No. 16900490.0 dated Sep. 24, 2021.

CNOA—The Third Office Action of Chinese Patent Application No. 201680084882.1 dated Jan. 30, 2022 with English Translation.

* cited by examiner

F I G. 2
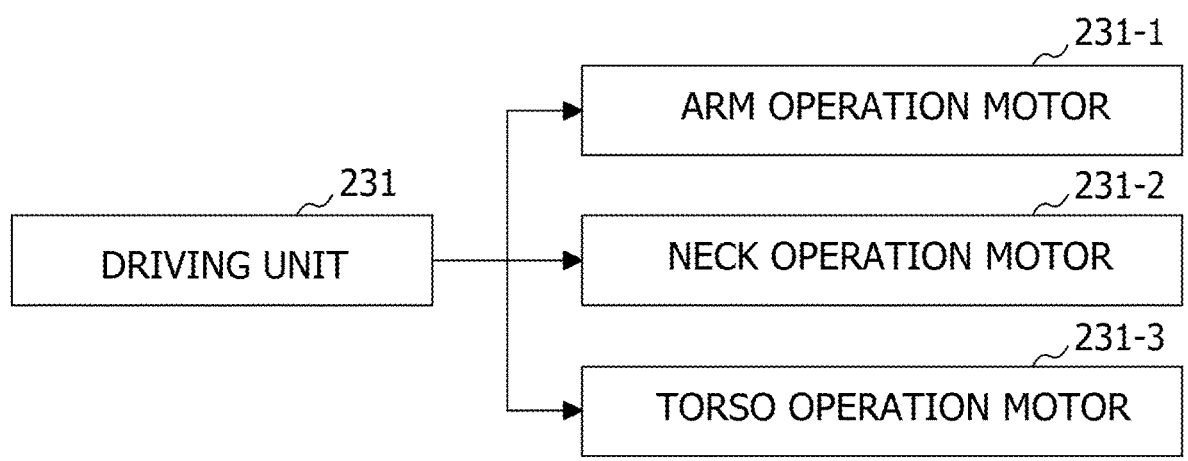

| USER INFORMATION | VIP | GENERAL | EMPLOYEE |
|---|---|---|---|
| INCLINATION | LARGE | MEDIUM | SMALL |

| USER DISTANCE | CASE WHERE USER APPROACHES | CASE WHERE USER GOES AWAY | CASE OF THANKING USER |
|---|---|---|---|
| INCLINATION | FIRST | SIMULTANEOUS | LATER |
| HEAD | LATER | SIMULTANEOUS | FIRST |

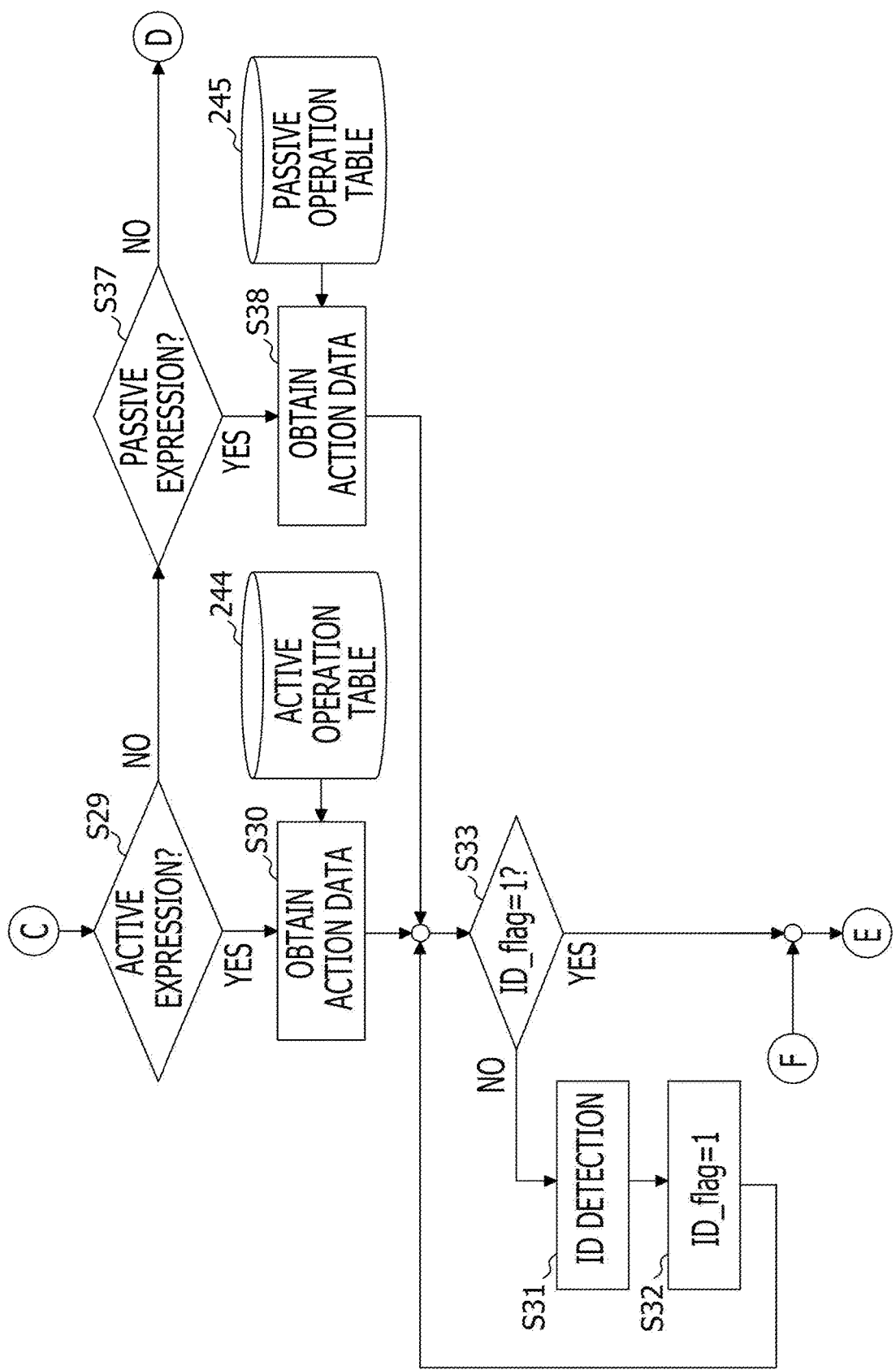

FIG. 9

| | | | 242 | | 243 | |
|---|---|---|---|---|---|---|
| | | SCENE | GUIDANCE SCENE | GUIDANCE SCENE | GUIDANCE SCENE | DEFAULT | DEFAULT | PSYCHOLOGICAL EXPRESSION SCENE |
| INPUT | ENVIRONMENT SETTING FUNCTION (241) | | | | | | | |
| | FACE TRACKING FUNCTION | PRESENCE OR ABSENCE | ○ | | | ○ | | ○ |
| | PERSONAL INFORMATION DETECTING FUNCTION | PRESENCE OR ABSENCE OF PERSONAL INFORMATION | | ○ | | ○ | | |
| | CONTACT DETECTING FUNCTION | PRESENCE OR ABSENCE OF CONTACT | | | | ○ | | |
| | USER INTENTION DETECTING FUNCTION | DIRECTING ATTENTION TO VICINITY | ○ | | | | | |
| | | DIRECTING ATTENTION TO DISTANT POSITION | | ○ | | | | |
| | | DESIRING TO GIVE GREETINGS | | | | | | |
| | USER PRESENCE DETECTING FUNCTION | PRESENCE OR ABSENCE OF USER | ○ | ○ | | ○ | ○ | ○ |
| | DISTANCE DETECTING FUNCTION | DISTANCE | NEAR | NEAR | | NEAR | NEAR | FAR |
| OUTPUT | KIND OF EXPRESSION | ACTIVE EXPRESSION | VICINITY INDICATION | DISTANT POSITION INDICATION | | | | |
| | | PASSIVE EXPRESSION | | | | SURPRISE | JOY | |
| | | PSYCHOLOGICAL EXPRESSION | | | | | | HIGH AFFINITY |

FIG. 10

| OUTPUT | VICINITY INDICATION | DISTANT POSITION INDICATION | BOWING | THINKING OR HESITATION | ASSERTION | CHANGING ATTITUDE ACCORDING TO PERSON | QUIP | CHEERING |
|---|---|---|---|---|---|---|---|---|
| HEAD TILT | DOWNWARD | UPWARD | DOWNWARD | UPWARD | UPWARD | VARIABLE ANGLE | UPWARD | UPWARD |
| HEAD PAN | LEFT AND RIGHT | LEFT AND RIGHT | FRONT | LEFT AND RIGHT | FRONT | FRONT | LEFT AND RIGHT | FRONT |
| RIGHT ARM | INDICATE | UPWARD (INDICATE) | DOWNWARD | DOWNWARD | UPWARD | DOWNWARD | UPWARD | UPWARD |
| LEFT ARM | INDICATE | UPWARD (INDICATE) | DOWNWARD | DOWNWARD | UPWARD | DOWNWARD | UPWARD | UPWARD |
| TORSO TILT (INCLINING OPERATION) | FORWARDLY INCLINING ATTITUDE | BENDING BACKWARD | LEANING FORWARD | LEANING FORWARD | LEANING FORWARD | VARIABLE ANGLE | LEANING FORWARD | BENDING BACKWARD |
| TORSO PAN | LEFT AND RIGHT | LEFT AND RIGHT | FRONT | LEFT AND RIGHT | FRONT | FRONT | LEFT AND RIGHT | FRONT |

| OUTPUT | SURPRISE | JOY | DISCOURA-GEMENT | EMBARRASSMENT | QUESTION | ANGER | BOREDOM |
|---|---|---|---|---|---|---|---|
| HEAD TILT | UPWARD | UPWARD | DOWNWARD | - | UPWARD | DOWNWARD | DOWNWARD |
| HEAD PAN | - | - | - | SWINGING | LEFT AND RIGHT | - | SWINGING |
| RIGHT ARM | UPWARD | UPWARD | FORWARD | UPWARD (SWINGING) | - | - | SWINGING |
| LEFT ARM | UPWARD | UPWARD | FORWARD | UPWARD (SWINGING) | - | - | SWINGING |
| TORSO TILT (INCLINING OPERATION) | BENDING BACKWARD | BENDING BACKWARD | LEANING FORWARD | BENDING BACKWARD | LEANING FORWARD | LEANING FORWARD | SWINGING BACK AND FORTH |
| TORSO PAN | - | - | - | SWINGING | LEFT AND RIGHT | - | SWINGING |

| OUTPUT | SURPRISE | JOY | DISCOURAGEMENT |
|---|---|---|---|
| RED (R) | ◎ | - | - |
| GREEN (G) | - | ◎ | - |
| BULE (B) | - | - | ◎ |

| OUTPUT | SURPRISE | JOY | DISCOURAGEMENT |
|---|---|---|---|
| HIGH-PITCHED SOUND (10 kHz AND HIGHER) | ◎ | - | - |
| MIDDLE-PITCHED SOUND (2 TO 10 kHz) | - | ◎ | - |
| LOW-PITCHED SOUND (0 TO 2 kHz) | - | - | ◎ |

ROBOT

CROSS-REFERENCE TO RELATED APPLICATION

This application is a continuation application of International Application PCT/JP2016/063438 filed on Apr. 28, 2016 and designated the U.S., the entire contents of which are incorporated herein by reference.

FIELD

The present invention relates to a robot.

BACKGROUND

Robots include an installation type robot and a humanoid robot. Sota (registered trademark in Japan) manufactured by Vstone Co., Ltd. is an example of the installation type robot. In addition, Pepper (registered trademark in Japan) manufactured by SoftBank Robotics Corp. is an example of the humanoid robot.

The installation type robot performs simple operations such as indicating, a direction by holding out a hand, for example, in response to a question from a user. A degree of freedom of operation of the installation type robot is relatively low, and is close to a gesture synchronized with audio output. The installation type robot has a simple configuration, and can therefore be reduced in size and cost. However, it is difficult for the installation type robot to perform an expression such as an emotional expression or the like by a gesture at a time of interaction with the user.

On the other hand, the humanoid robot has joints substantially similar to those of a human, and can therefore indicate a direction by an arm, a hand, or a finger, or incline a head. A degree of freedom of operation of the humanoid robot is relatively high, so that an expression such as an emotional expression or the like can be performed by a gesture. However, in order for the humanoid robot to bow, for example, many joints of arms, feet, shoulders, a waist, a neck, and the like need to be controlled appropriately. Therefore, in addition to a complex configuration of the joints and the like, complex control of the joints and the like is required of the humanoid robot. In addition, because of the complex configuration of the joints and the like, it is difficult to reduce size and cost of the humanoid robot.

Hence, it becomes difficult to perform an expression such as an emotional expression or the like by a gesture when the degree of freedom of operation is reduced as in the installation type robot, and it becomes difficult to reduce the size and cost of the robot when enabling an expression such as an emotional expression or the like by a gesture by increasing the degree of freedom of operation as in the humanoid robot. In such a trade-off relation depending on an increase or a decrease in the degree of freedom of operation of the robot, there is a desire to perform expressions such as many emotional expressions and the like by gestures with a low degree of freedom of operation.

SUMMARY

According to one aspect of the embodiments, a robot for performing an expression by a non-verbal reaction, includes a body including a lower part provided so as to be capable of panning and tilting with respect to a support point coupled to a placement surface; a pair of arms provided to side parts of the body so as to be capable of moving up and down; and a head provided to an upper part of the body so as to be capable of panning and tilting, wherein the non-verbal reaction includes a combination of the tilting of the body with respect to the support point and movement of the pair of arms or the head or any combination thereof.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a block diagram illustrating an example of a driving unit;

FIG. 5 is a diagram illustrating an example of an inclination setting table;

FIG. 6 is a diagram illustrating an example of an expression order table;

FIGS. 8A to 8C are flowcharts of assistance in explaining an example of operation of the robot;

FIG. 9 is a diagram illustrating an example of an interaction state estimation table;

FIG. 10 is diagram illustrating an example of an active operation table;

FIG. 11 is a diagram illustrating an example of a passive operation table;

FIG. 13 is a diagram illustrating an example of n LED expression table;

FIG. 14 is a diagram illustrating an example of a sound expression table;

DESCRIPTION OF EMBODIMENTS

With the conventional robot, it is difficult to perform many kinds of expressions by gestures with a low degree of freedom of operation.

A disclosed robot performs an expression such as an emotional expression or the like by a non-verbal reaction including a gesture. The robot includes: a body including a lower part provided so as to be capable of panning and tilting with respect to a support point coupled to a placement surface; a pair of arms provided to side parts of the body so as to be capable of moving up and down; and a head provided to an upper part of the body so as to be capable of panning and tilting. The non-verbal reaction is a combination of tilting of the body with respect to the support point and movement of at least one of the pair of arms or the head or any combination thereof.

Each embodiment of the disclosed robot will be described in the following together with the drawings.

Figure 1:
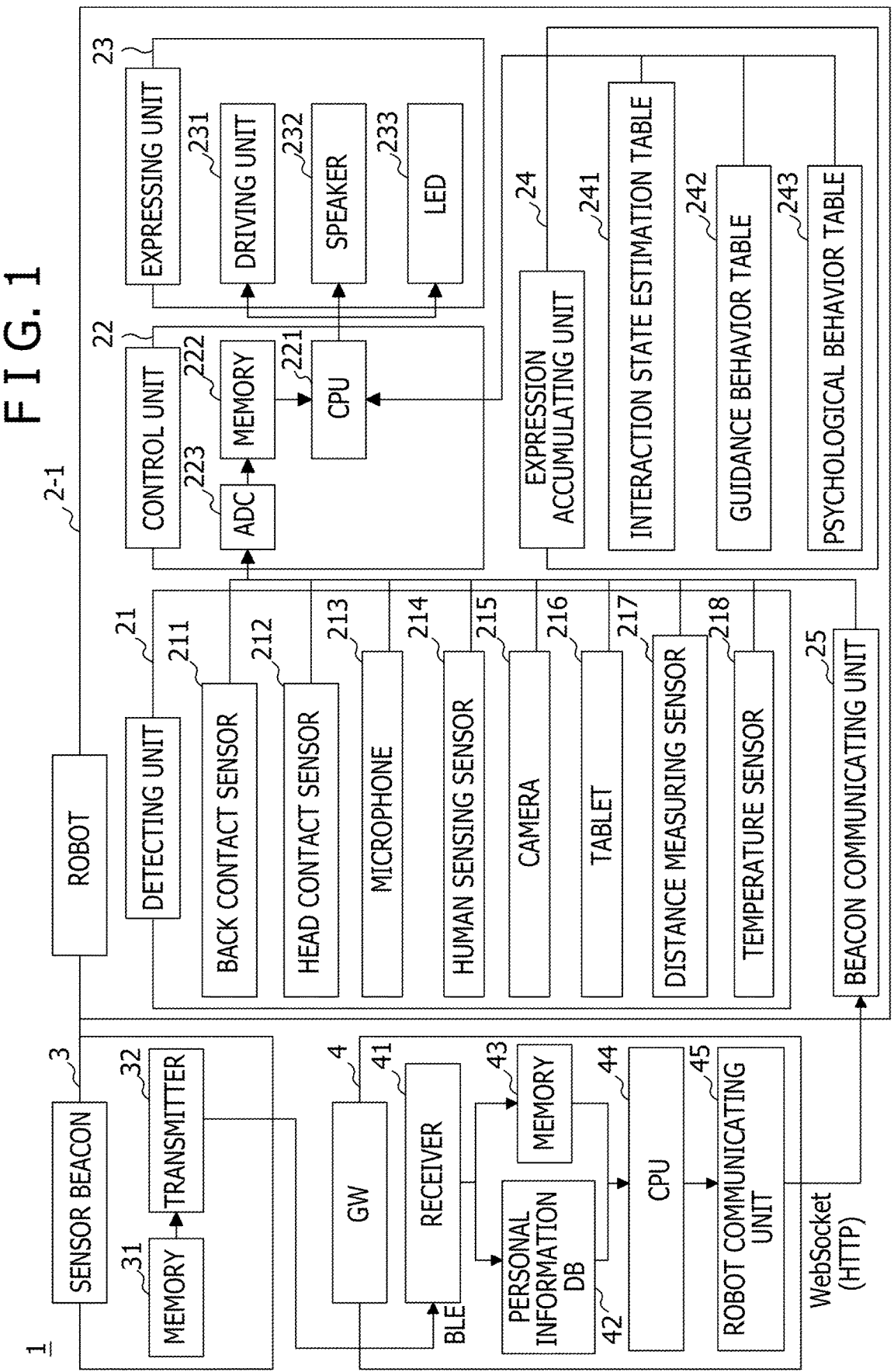
FIG. 1 is a block diagram illustrating an example of a hardware configuration of a system in one embodiment.

FIG. 1 is a block diagram illustrating an example of a hardware configuration of a system in one embodiment. A system 1 illustrated in FIG. 1 includes a robot 2-1, a sensor beacon 3, and a gateway (GW: Gate-Way) 4. The system 1 is, for example, applied to an exhibition site. Therefore, the robot 2-1 and the GW 4 are arranged within the exhibition site, and may be arranged in a same position. The robot 2-1 is disposed within one exhibition booth, for example, within the exhibition site. The sensor beacon 3 is carried by a visitor who tours the exhibition site. The sensor beacon 3 may be housed in a neck hanging card holder that the visitor can hang from the neck of the visitor, for example. The visitor is an example of a user provided with service.

The robot 2-1 includes a detecting unit 21, a control unit 22, an expressing unit 23, an expression accumulating unit 24, and a beacon communicating unit 25. The beacon communicating unit 25 may include a transceiver. The detecting unit 21 includes a back contact sensor 211, a head contact sensor 212, a microphone 213, a human sensing sensor 214, a camera 215, a tablet 216, a distance measuring sensor 217, and a temperature sensor 218. The control unit 22 includes a CPU 221, a memory 222, and an analog-to-digital, converter (ADC: Analog-to-Digital Converter) 223. The expressing unit 23 includes a driving unit 231, a speaker 232, and a light emitting diode (LED: Light Emitting Diode) 233 as an example of a light source. The expression accumulating unit 24 accumulates driving patterns of the body, arm, and head of the robot 2-1 for making expressions determined according to detection information detected by the detecting unit 21. In the present example, the expression accumulating unit 24 has an interaction state estimation table 241, a guidance action (hereinafter referred to also as "behavior") table 242, and a psychological behavior table 243. The information detected by the detecting unit 21 and a beacon ID received by the beacon communicating unit 25 from the sensor beacon 3 are stored into the memory 222 via the ADC 223 within the control unit 22. The CPU 221 within the control unit 22 reads an interaction state, guidance behavior, and psychological behavior from the interaction state estimation table 241, the guidance behavior table 242, and the psychological behavior table 243 within the expression accumulating unit 24. In addition, the CPU 221 within the control unit 22 drives the driving unit 231, the speaker 232, and the LED 233 within the expressing unit 23.

The sensor beacon 3 is an example of an active tag. The sensor beacon 3 includes a memory 31 and a transmitter 32. The transmitter 32 performs communication with the GW 4 compliant with BLE (Bluetooth Low Energy, registered trademark in Japan), for example. The memory 31 stores a beacon ID as an example of identification information for identifying each sensor beacon 3.

The GW 4 is an example of a communication control device that receives the beacon ID transmitted by the sensor beacon 3 and can communicate with the robot 2-1. The GW 4 includes a receiver 41, a personal information database (DB: Data-Base) 42, a memory 43, a CPU (Central Processing Unit) 44, and a robot communicating unit 45. The CPU 44 is an example of a processor that controls operation of the whole of the GW 4. The receiver 41 receives the beacon ID transmitted from the sensor beacon 3 under control of the CPU 44, and detects a reception radio field intensity (that is, a signal reception strength) and the like. The robot communicating unit 45 performs communication compliant with WebSocket (HTTP, registered trademark in Japan), for example, with the robot 2-1 under control of the CPU 44. The memory 43 may store a program executed by the CPU 44 or the like. In the present example, each sensor beacon 3 has the name of the visitor registered therein at a time of registration of the visitor at a reception desk of the exhibition site, for example. Therefore, in the DB 42, a user ID for identifying the visitor is registered in association with the beacon ID of the corresponding sensor beacon 3 together with the name of the visitor. The user ID is an example of identification information for identifying each user. The CPU 44 can also control operation of the robot 2-1 based on the beacon ID from the sensor beacon 3, FIG. 2 is a block diagram illustrating an example of the driving unit. As illustrated in FIG. 2, under control of the control unit 22 (that is, the CPU 221), the driving unit 231 drives an arm operation motor 231-1 that moves up and down the left and right arms of the robot 2-1, a neck operation motor 231-2 that pans and tilts the neck of the robot 2-1, and a torso operation motor 231-3 that pans and tilts the body of the robot 2-1.

Figure 3:
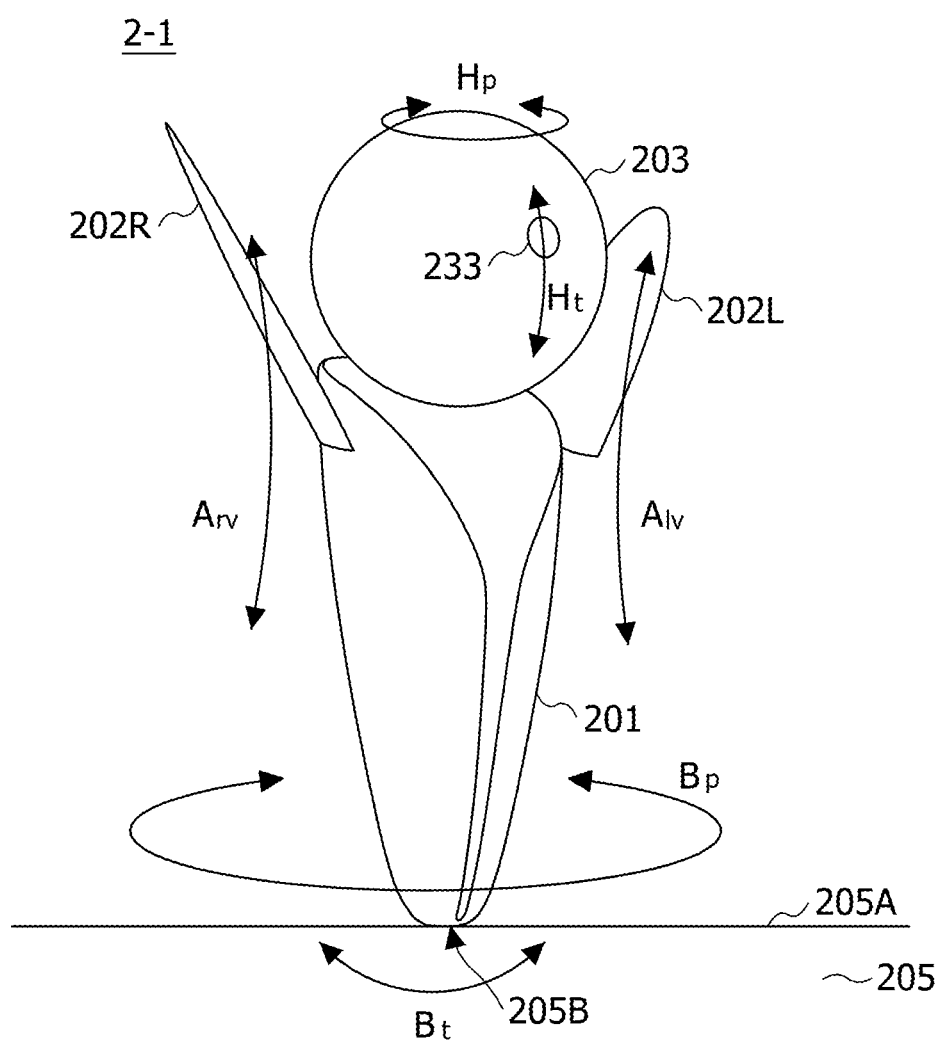
FIG. 3 is a perspective view illustrating an example of a robot.

FIG. 3 is a perspective view illustrating an example of the robot. The robot 2-1 illustrated in FIG. 3 includes: a body 201 provided so as to be capable of panning and tilting with respect to a support point 205B on a placement surface 205A of a base 205; a pair of left and right arms 202L and 202R provided to side parts of the body 201 so as to be capable of moving up and down; and a head 203 provided to an upper part of the body 201 so as to be capable of panning and tilting. A front, portion of the head 203 is provided with the LED 233 of the expressing unit 23. In the present example, when the LED 233 is driven and turned on, light emitted from the LED 233 passes through the front portion of the head 203. The user therefore sees full-color transmitted light. The body 201 is driven by the torso operation motor 231-3 so as to be capable of panning in a direction indicated by an arrow Bp, and capable of tilting in a direction indicated by an arrow Bt. The left arm 202L is driven by the arm operation motor 231-1 so as to be capable of moving up and down in a direction indicated by an arrow Alv. The right arm 202R is driven by the arm operation motor 231-1 so as to be capable of moving up and down in a direction indicated by an arrow Arv. The head 203 is driven by the neck operation motor 231-2 so as to be capable of panning in a direction indicated by an arrow Hp, and capable of tilting in a direction indicated by an arrow Ht. The shape of the base 205 is not particularly limited, but may be a box shape, for example. In addition, the base 205 may form a part of the robot 2-1.

By driving the torso operation motor 231-3, the driving unit 231 can pan the body 201 in the direction indicated by the arrow Bp by a twist angle of ±90 degrees, for example, and can tilt the body 201 in the direction indicated by the arrow Bt by an inclination angle of ±15 degrees, for example. In addition, by driving the arm operation motor 231-1, the driving unit 231 can move up and down the arms 202L and 202R separately from each other in the direction indicated by the arrow Arv by a swing-up angle of ±90 degrees, for example. Further, by driving the neck operation motor 231-2, the driving unit 231 can pan the head 203 in the direction indicated by the arrow Hp by a neck swing angle of ±150 degrees, for example, and can tilt the head 203 in the direction indicated by the arrow Ht by a nod angle of ±30 degrees, for example. Thus, the degree of freedom of the body 201 is two, the degree of freedom of each of the arms 202L and 202R is one, and the degree of freedom of the head 203 is two. The degree of freedom of the whole of the robot 2-1 therefore totals six.

Incidentally, the body 201 or the like can be miniaturized by arranging the torso operation motor 231-3 or an actuator, a gravity canceler, or the like of the robot 2-1 within the base 205. In addition, at least the control unit 22 can be disposed within the base 205.

The back contact sensor 211 is disposed in a back part of the body 201 of the robot 2-1. The head contact sensor 212 is disposed in the head 203 of the robot 2-1. The microphone 213, the human sensing sensor 214, the camera 215, the tablet 216, the distance measuring sensor 217, and the temperature sensor 218 may each be disposed on the robot 2-1 side, or may be disposed on the base 205 side. As an example, the camera 215 may be disposed in a central part of the head 203 of the robot 2-1, and track the face of the user. In addition, the microphone 213, the human sensing sensor 214, the tablet 216, the distance measuring sensor 217, and the temperature sensor 218 may be arranged in the base 205. The human sensing sensor 214 may be disposed at four positions of the base 205, for example, so as to be capable of sensing a human along four directions of the front, rear, left, and right of the robot 2-3, for example. Incidentally, when the robot 2-1 and the GW 4 are coupled to each other by a cable, the cable may, for example, be drawn out from the back surface of the base 205 or the like.

A lower part of the body 201 of the robot 2-1 is supported by the support point 205B on the placement surface 205A, and is capable of panning in the direction indicated by the arrow Bp and capable of tilting in the direction indicated by the arrow Bt. The tilting of the body 201 enables the robot 2-1 to perform overaction. That is, an expression such as an emotional expression or the like can be performed by a non-verbal reaction including a gesture by using a combination of the tilting of the body 201 with respect to the support point 205B and movement of at least one of the pair of arms 202L and 202R and the head 203. In addition, the non-verbal reaction may be a further combination with at least one of audio output from the speaker 232 and turning on or off of the LED 233.

Figure 4:
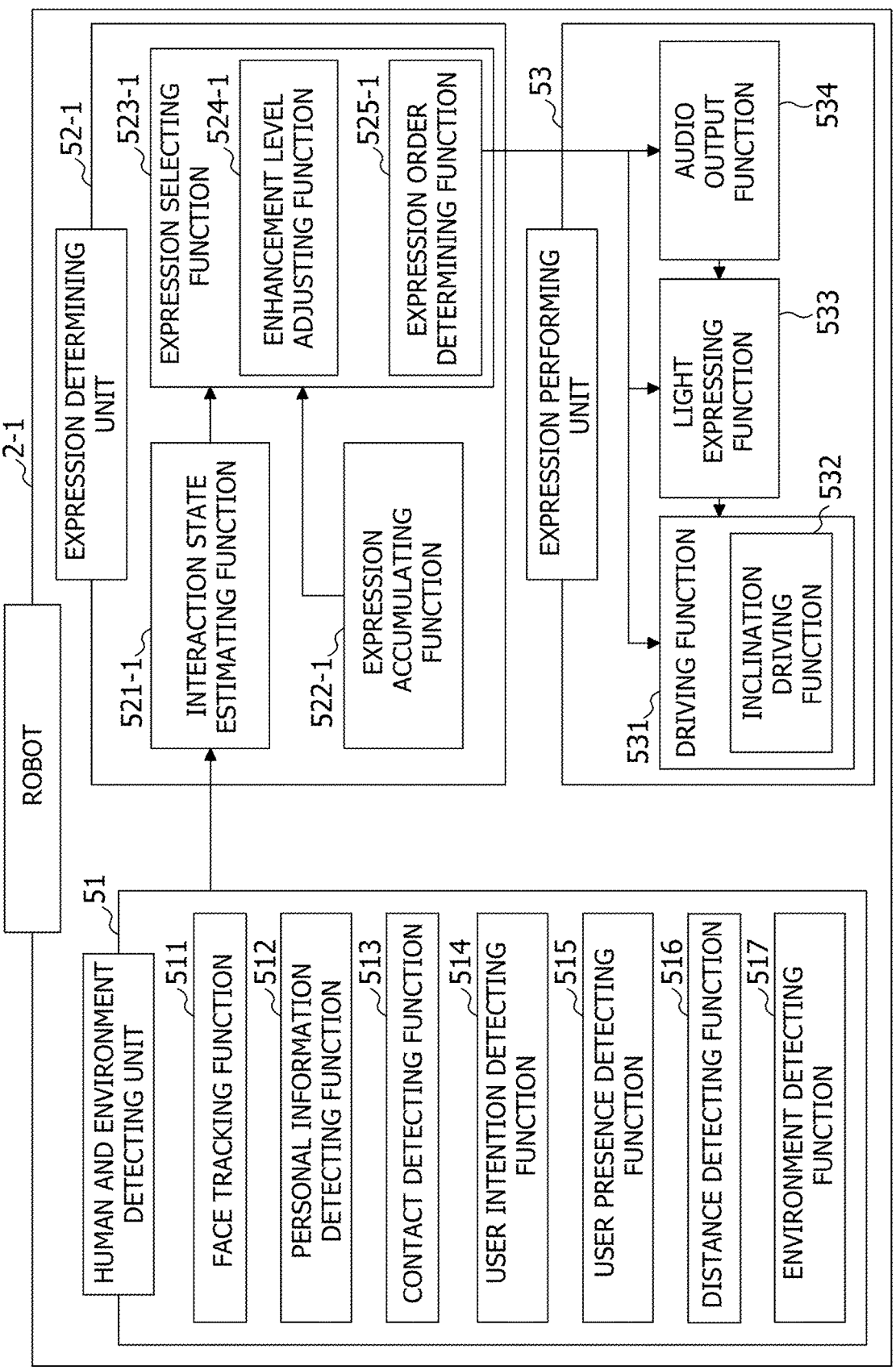
FIG. 4 is a functional block diagram illustrating a first example of a functional configuration of the robot.

FIG. 4 is a functional block diagram illustrating a first example of a functional configuration of the robot. The robot 2-1 illustrated in FIG. 4 includes a human and environment detecting unit 51, an expression determining unit 52-1, and an expression performing unit 53. The human and environment detecting unit 51 has a face tracking function 511, a personal information detecting function 512, a contact detecting function 513, a user intention detecting function 514, a user presence detecting function 515, a distance detecting function 516, and an environment detecting function 517.

The face tracking function 511 is a function of the CPU 221 which function tracks the face of a user photographed by the camera 215. The personal information detecting function 512 is a function of the CPU 221 which function detects personal information of the user from voice input of the user which voice input is detected by the microphone 213 or manual input of the user which manual input is detected by the tablet 216. In a case where the beacon communicating unit 25 receives the contents of the personal information DB 42 of the GW 4 receiving the beacon ID transmitted from the sensor beacon 3, and stores the contents in the memory 222, the personal information detecting function 512 can detect the personal information of the user by referring to the personal information within the memory 222 according to the voice input or manual input of the user. The contact detecting function 513 is a function of the CPU 221 which function detects contact (that is, a touch) of the user with the robot 2-1 when at least one of the back contact sensor 211, the head contact sensor 212, and the tablet 216 detects the contact (that is, the touch) by the user. The user intention detecting function 514 is a function of the CPU 221 which function detects an intention (or a user distance) of the user from the voice input of the user which voice input is detected by the microphone 213 or the manual input of the user which manual input is detected by the tablet 216. The user intention detecting function 514 may include a well-known voice recognition function that recognizes the speech content of the voice input. On the other hand, the intention of the user may be directly input to the robot 2-1 by the manual input. The user presence detecting function 515 is a function of the CPU 221 which function detects the presence of the user when the human sensing sensor 214 detects the user approaching the robot 2-1. The distance detecting function 516 is a function of the CPU 221 which function detects a distance to the user approaching the robot 2-1 when the distance measuring sensor 217 measures the distance. The environment detecting function 517 is a function of the CPU 221 which function detects the temperature of an environment in which the robot 2-1 is installed when the temperature sensor 218 detects the temperature.

The expression determining unit 52-1 has an interaction state estimating function 521-1, an, expression accumulating function 522-1, and an expression selecting function 523-1. The expression selecting function 523-1 includes an enhancement level adjusting function 524-1 and an expression order determining function 525-1. The expression accumulating function 522-1 is a function of the CPU 221 which function accumulates a plurality of kinds of expression contents expressed by the robot 2-1, and includes expressions such as emotional expressions and the like by non-verbal reactions including gestures. The expression accumulating function 522-1 may include, for example, a basic behavior table, a guidance behavior table 242 specialized in guidance service, and the like. The interaction state estimating function 521-1 is a function of the CPU 221 which function estimates an interaction state between the robot 2-1 and the user by using the interaction state estimation table 241 to be described later, for example, and determines expression contents according to information detected by the human and environment detecting unit 51. The expression selecting function 523-1 is a function of the CPU 221 which function determines rough expression contents of the robot 2-1, including inclination angles of the robot 2-1, from the plurality of kinds of expression contents accumulated by the expression accumulating function 522-1, by referring to an active operation table 244 and a passive operation table 245 to be described later based on the interaction state estimated by the interaction state estimating function 521-1.

The enhancement level adjusting function 524-1 is a function of the CPU 221 which function adjusts an enhancement level that enhances the expression contents determined by the expression selecting function 523-1. For example, in a case where the expression contents are a bow, the body 201 is adjusted to an inclination corresponding to the personal information detected by the personal information detecting function 512 by referring to an inclination setting table 246 illustrated in FIG. 5, for example, based on the personal information. FIG. 5 is a diagram illustrating an example of the inclination setting table. In the example illustrated in FIG. 5, the inclination is adjusted to "large" when the user information is VIP, the inclination is adjusted to "medium" when the user information is general, and the inclination is adjusted to "small" when the user information is employee. The expression order determining function 525-1 is a function of the CPU 221 which function determines order in which to perform the expression contents determined by the expression selecting function 523-1. For example, in a case where the expression contents are a bow, whether to incline the body 201 after bowing the head 203 or whether to bow the head 203 after inclining the body 201, for example, is determined by referring to an expression order table 247 illustrated in FIG. 6, for example, based on the user distance detected by the user intention detecting function 514. FIG. 6 is a diagram illustrating an example of the expression order table. In the example illustrated in FIG. 6, the expression order is determined such that "the inclination of the body is first and the inclination of the head is later" when the user distance indicates a case where the user approaches (attention is directed to a vicinity), such that "the inclination of the body and the inclination of the head are simultaneous" when the user distance indicates a case where the user goes away from the robot 2-1 (attention is directed to a distant position), and such that the inclination of the body is later and the inclination of the head is first when the user distance indicates a case where the user thanks the robot 2-1 (desires to give greetings).

The inclination setting able 246 and the expression order table 247 may be arranged within the expression accumulating unit 24, for example.

The expression performing unit 53 includes a driving function 531, a light expressing function 533, and an audio output function 534. The driving function 531 includes an inclination driving function 532. The driving function 531 is a function of the CPU 221 which function performs expression by controlling operation of the robot 24 while driving the arm operation motor 231-1, the neck operation motor 231-2, and the torso operation motor 231-3 by the driving unit 231. The inclination driving function 532 of the driving function 531 controls the inclination of the body 201 and the inclination of the head 203. The light expressing function 533 is a function of the CPU 221 which function performs expression by the presence or absence of light emission and light emission color by controlling the turning on or off of the LED 233. The audio output, function 534 is a function of the CPU 221 which function performs expression by audio output by controlling the audio output from the speaker 232. The expression using the LED 233 by the light expressing function 533 and the expression using the audio output from the speaker 232 by the audio output function 534 are interlocked with expression using movement of the body 201, the arms 202L and 202R, and the head 203 by the inclination driving function 532.

Figure 7:
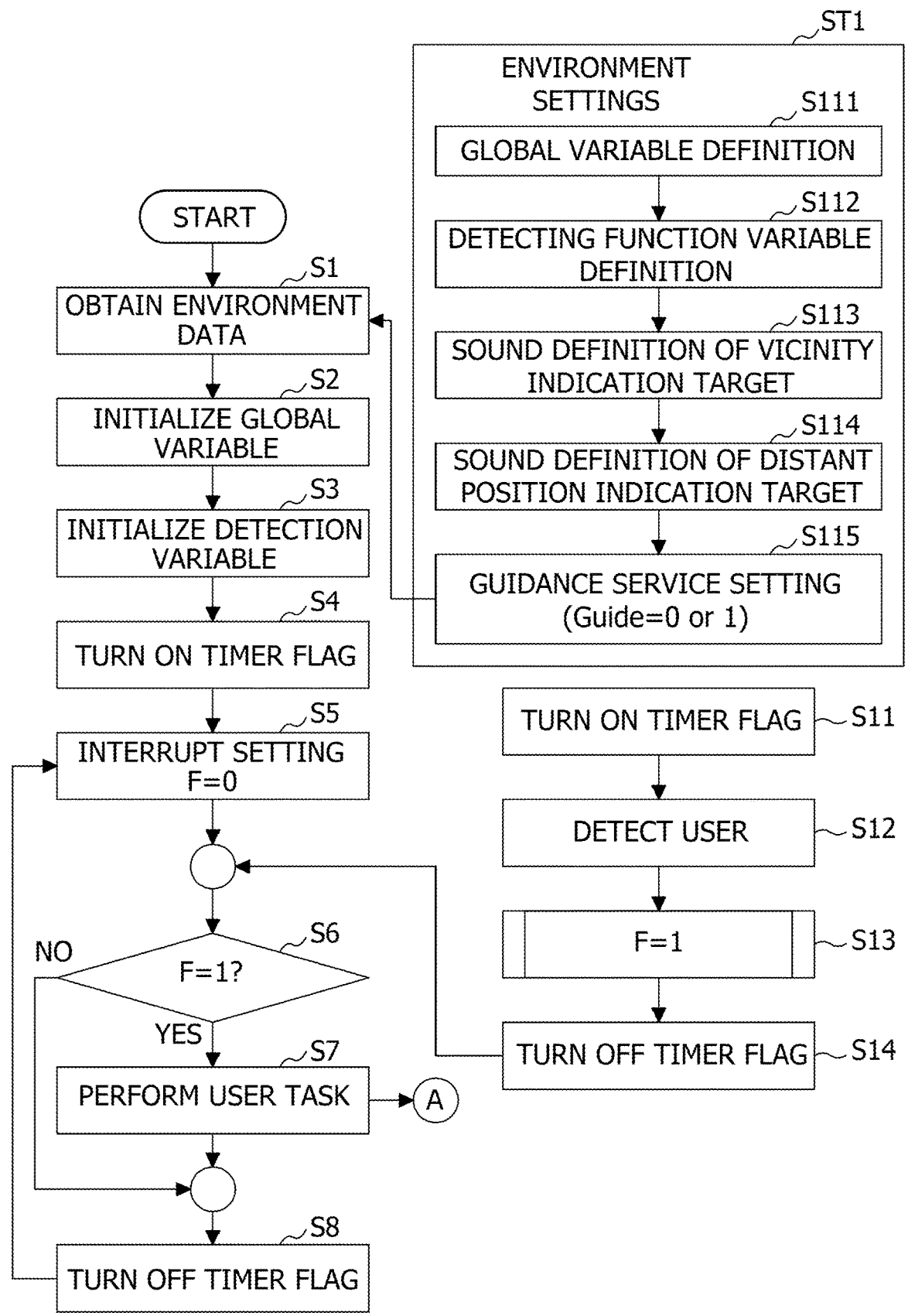
FIG. 7 is a flowchart of assistance in explaining an example of operation of the robot.

FIG. 7, FIGS. 8A to 8C, and FIG. 12 are flowcharts of assistance in explaining an example of operation of the robot. In FIG. 7, the processing of steps S1 to S8 and S11 to S14 can be performed by the CPU 221 of the robot 2-1. In step S1 illustrated in FIG. 7, the CPU 221 obtains environment data on an environment in which the robot 2-1 is installed. As an example, environment settings ST1 may be defined or set in advance. In the example illustrated in FIG. 7, the environment settings ST1 include a global variable definition S111, a detecting function variable definition S112, a sound definition S113 of a vicinity indication target, a sound definition S114 of a distant position indication target, and a guidance service setting (Guide=0 or 1) S115.

In step S2, the CPU 221 initializes a global variable. In step S3, the CPU 221 initializes a detection variable. In step S4, the CPU 221 turns a timer flag on (ON). In step S5, the CPU 221 resets an interrupt setting to F=0. Here, F denotes an execution flag set to F=1 when the human sensing sensor 214 (or the user presence detecting function 515) detects a user in the vicinity of the robot 2-1. In step S6, the CPU 221 determines whether or not F=1. When a result of the determination is YES, the processing proceeds to step S7. When the result of the determination is NO, the processing proceeds to step S8. In step S7, the CPU 221 performs a user task. The processing proceeds to step S8 on one hand, and proceeds to step S21 illustrated in FIG. 8A on the other hand. In step S8, the CPU 221 turns the timer flag off (OFF). The processing then returns to step S5.

Timer processing includes steps S11 to S14. In step S11, the CPU 221 turns the timer flag ON. In step S12, the CPU 221 detects the presence of a user in the vicinity of the robot 2-1. In step S13, the CPU 221 sets the execution flag F to F=1. In step S14, the CPU 221 turns the timer flag OFF. The processing then proceeds to step S6.

Figure 8A:
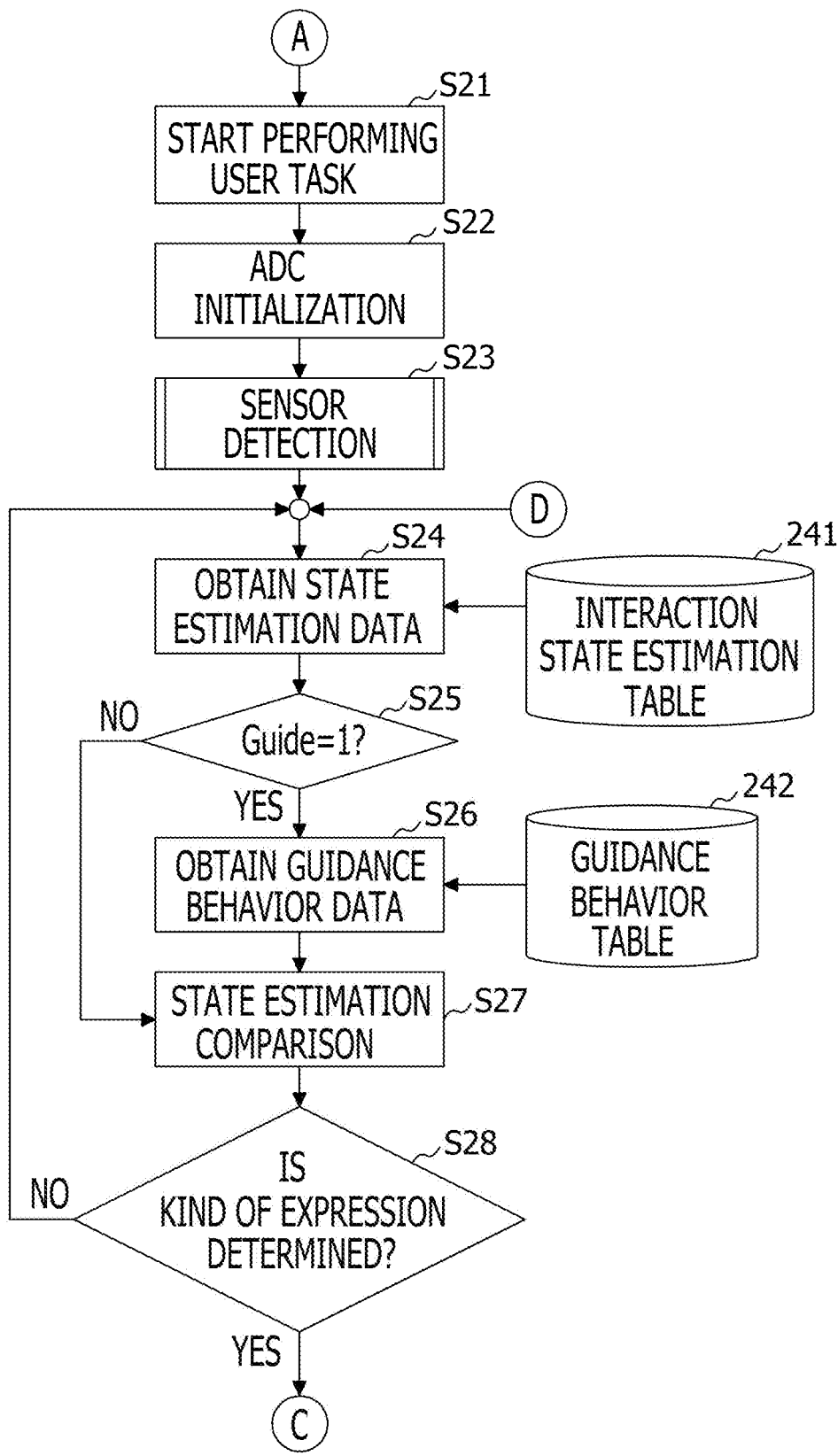
Figure 8C:
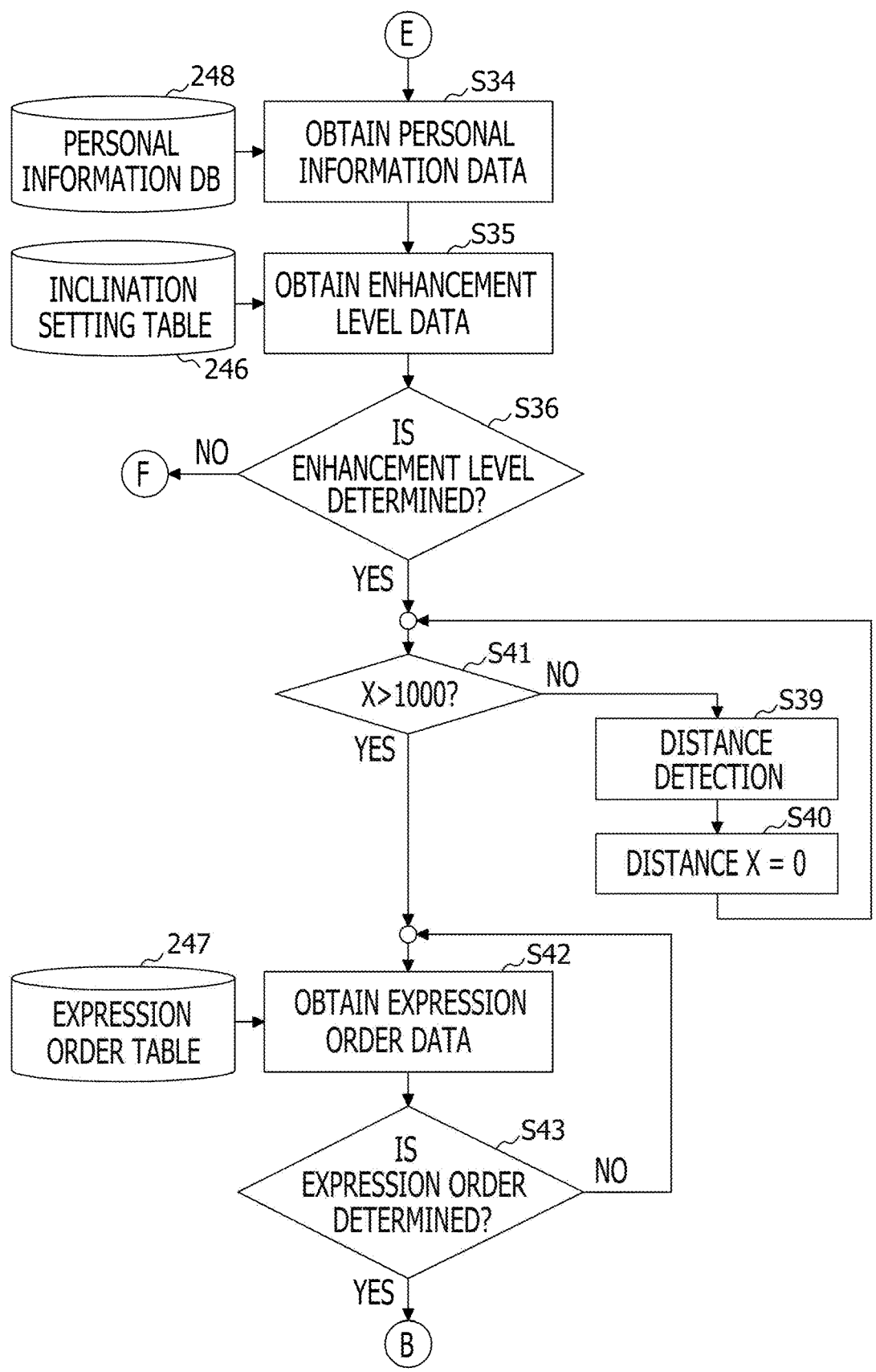

In FIGS. 8A to 8C, the processing of steps S21 to S43 can be performed by the CPU 221 of the robot 2-1. In step S21 illustrated in FIG. 8A, the CPU 221 starts performing the user task. In step S22, the CPU 221 initializes the ADC 223. In step S23, the CPU 221 obtains detection information of the sensors 211 to 218 of the detecting unit 21. In step S24, the CPU 221 obtains state estimation data indicating a kind of expression to be output, by referring to the interaction state estimation table 241 with the detection information of the sensors 211 to 218 as input. FIG. 9 is a diagram illustrating an example of the interaction state estimation table. In FIG. 9, circle symbols represent items of corresponding expressions, and scenes represent an example of interaction states between the robot 2-1 and the user. In step S25, the CPU 221 determines whether or not Guide=1. When a result of the determination is YES, the processing proceeds to step S26. When the result of the determination is NO, the processing proceeds to step S27.

In step S26, the CPU 221 obtains guidance behavior data indicate a kind of expression in a guidance scene by referring to the guidance behavior table 242 with the detection information of the sensors 211 to 218 as input. In the present example, the guidance, behavior table 242 is included in the interaction state estimation table 241 illustrated in FIG. 9. In step S27, the CPU 221 compares the state estimation data with the guidance behavior data. In step S28, the CPU 221 determines by the comparison whether or not a kind of expression is determined. When a result of the determination in step S28 is NO, the processing returns to step S24. When the result of the determination is YES, the processing proceeds to step S29.

In step S29, the CPU 221 determines whether or not the determined kind of expression is an active expression. When a result of the determination is YES, the processing proceeds to step S30. When the result of the determination is NO, the processing proceeds to step S37 to be described later. In step S30, the CPU 221 obtains action data indicating an active operation by referring to the active operation table 244 illustrated in FIG. 10 with the detection information of the sensors 211 to 218 as input. FIG. 10 is a diagram illustrating an example of the active operation table, FIG. 10 illustrates an example in which active operations such as a head tilt, a head pan, the right arm, the left arm, a torso tilt, a torso pan, and the like express vicinity indication, distant position indication, bowing, thinking or hesitation, assertion, changing an attitude according to a person, (making) a quip, cheering, and the like.

In step S33, the CPU 221 determines whether or not ID_flag=1. When a result of the determination is YES, the processing proceeds to step S34. When the result of the determination is NO, the processing proceeds to step S31. In step S31, the CPU 221 obtains a user ID detected by the microphone 213 or the tablet 216 (or the personal information detecting function 512). In step S32, the CPU 221 sets ID_flag=1. The processing then proceeds to step S33.

In step S34, the CPU 221 obtains personal information data by referring to a personal information DB 248 with the user ID as input. The personal information DB 248 may, for example, be provided within the memory 222 or may be provided within the expression accumulating unit 24.

In step S35, the CPU 221 refers to the inclination setting table 246 illustrated in FIG. 5 with the personal information data indicating user information as input, and thereby obtains enhancement level data indicating an enhancement level of an inclination in accordance with the user information. In step S36, the CPU 221 determines whether or not the enhancement level of the inclination is determined. When a result of the determination is NO, the processing returns to step S34. When the result of the determination is YES, the processing proceeds to step S41.

In step S37, on the other hand, the CPU 221 determines whether or not the determined kind of expression is a passive expression. When a result of the determination is YES, the processing proceeds to step S38. When the result of the determination is NO, the processing returns to step S24 to be described later. In step S38, the CPU 221 obtains action data indicating a passive operation, by referring to a passive operation table 245 illustrated in FIG. 11 with the detection information of the sensors 211 to 218 as input. FIG. 11 is a diagram illustrating an example of the passive operation table. FIG. 11 illustrates an example in which passive operations such as a head tilt, a head pan, the right arm, the left arm, a torso tilt, a torso pan, and the like express surprise, joy, discouragement, embarrassment, question, anger, boredom, and the like. After step S38, the processing proceeds to step S33.

In step S39, on the other hand, the CPU 221 obtains a distance detected by the distance measuring sensor 217 (or the distance detecting function 516). In step S40, the CPU 221 resets the distance X to X=0. The processing then proceeds to step S41. In step S41, the CPU 221 determines whether or not X>1000. When a result of the determination is NO, the processing returns to step S39. When the result of the determination is YES, the processing proceeds to step S42.

In step S42, the CPU 221 obtains expression order data indicating order of expression of each part of the robot 2-1 by referring to the expression order table 247 illustrated in FIG. 6 with the user distance as input. In step S43, the CPU 221 determines whether or not the expression order data is determined. When a result of the determination is NO, the processing returns to step S42. When the result of the determination is YES, the processing, proceeds to the processing of FIG. 12.

Figure 12:
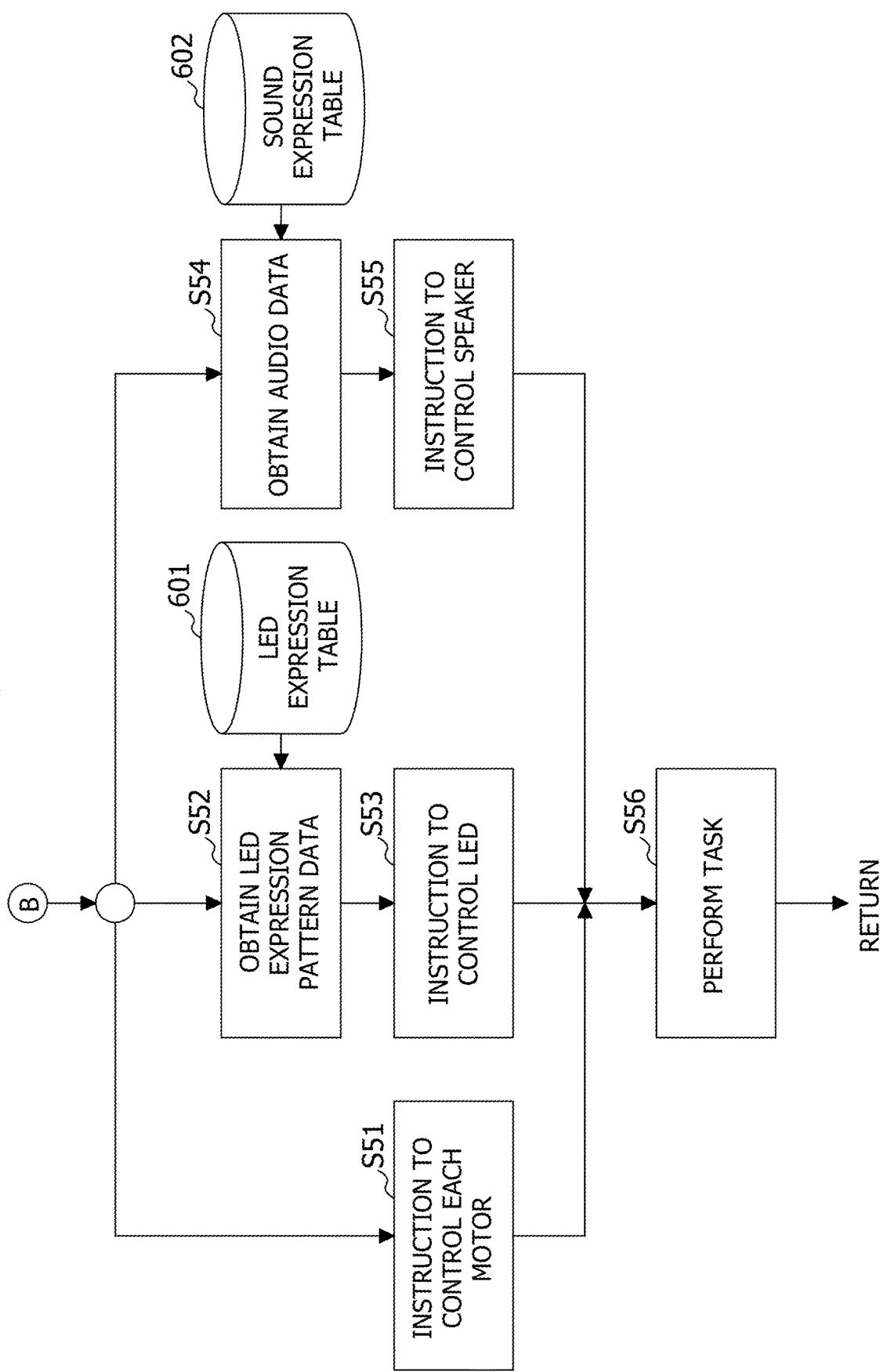
FIG. 12 is a flowchart of assistance in explaining an example of operation of the robot.

In FIG. 12, the processing of steps S51 to S56 can be performed by the CPU 221 of the robot 2-1. The processing of steps S51, S52, and S54 can be performed in parallel with each other. In step S51, the CPU 221 instructs the driving unit 231 (or the driving function 531) to control the motors 231-1, 231-2, and 231-3. The processing then proceeds to step S56. In step S52, the CPU 221 obtains an LED expression pattern of the LED 233 of red (R), green (G), and blue (B) controlled to be on or off according to an expression of surprise, joy, discouragement, or the like by referring to an LED expression table 601 illustrated in FIG. 13. FIG. 13 is a diagram illustrating an example of the LED expression table. FIG. 13 illustrates an example in which the output of the LED 233 of red (R), green (G), and blue (B) expresses surprise, joy, and discouragement. In FIG. 13, double circle symbols denote items of corresponding expressions. In step S53, the CPU 221 gives an instruction to control the LED 233 according to the obtained LED expression pattern data. The processing then proceeds to step S56.

In step S54, the CPU 221 obtains audio data to be output from the speaker 232 according to an expression such as surprise, joy, discouragement, or the like by referring to a sound expression table 602 illustrated in FIG. 14. In the present example, the audio data is, for example, buzzer sound or the like. FIG. 14 is a diagram illustrating an example of the sound expression table. FIG. 14 illustrates an example in which audio output of high-pitched sound, middle-pitched sound, and low-pitched sound from the speaker 232 expresses surprise, joy, and discouragement. In FIG. 14, double circle symbols denote items of corresponding expressions. In step S55, the CPU 221 gives an instruction for control that outputs the obtained audio data to the speaker 232. The processing then proceeds to step S56.

In step S56, the CPU 221 performs a task based on the control instructions for the driving unit 231, the LED 233, and the speaker 232. The processing then returns to step S1 illustrated in FIG. 7. The processing of steps S51, S52, and S54 can be performed in parallel with each other. Therefore, expression using the LED 233 and expression using the audio output from the speaker 232 are interlocked with expression using movement of the body 201, the arms 202L and 202R, and the head 203.

Figure 15:
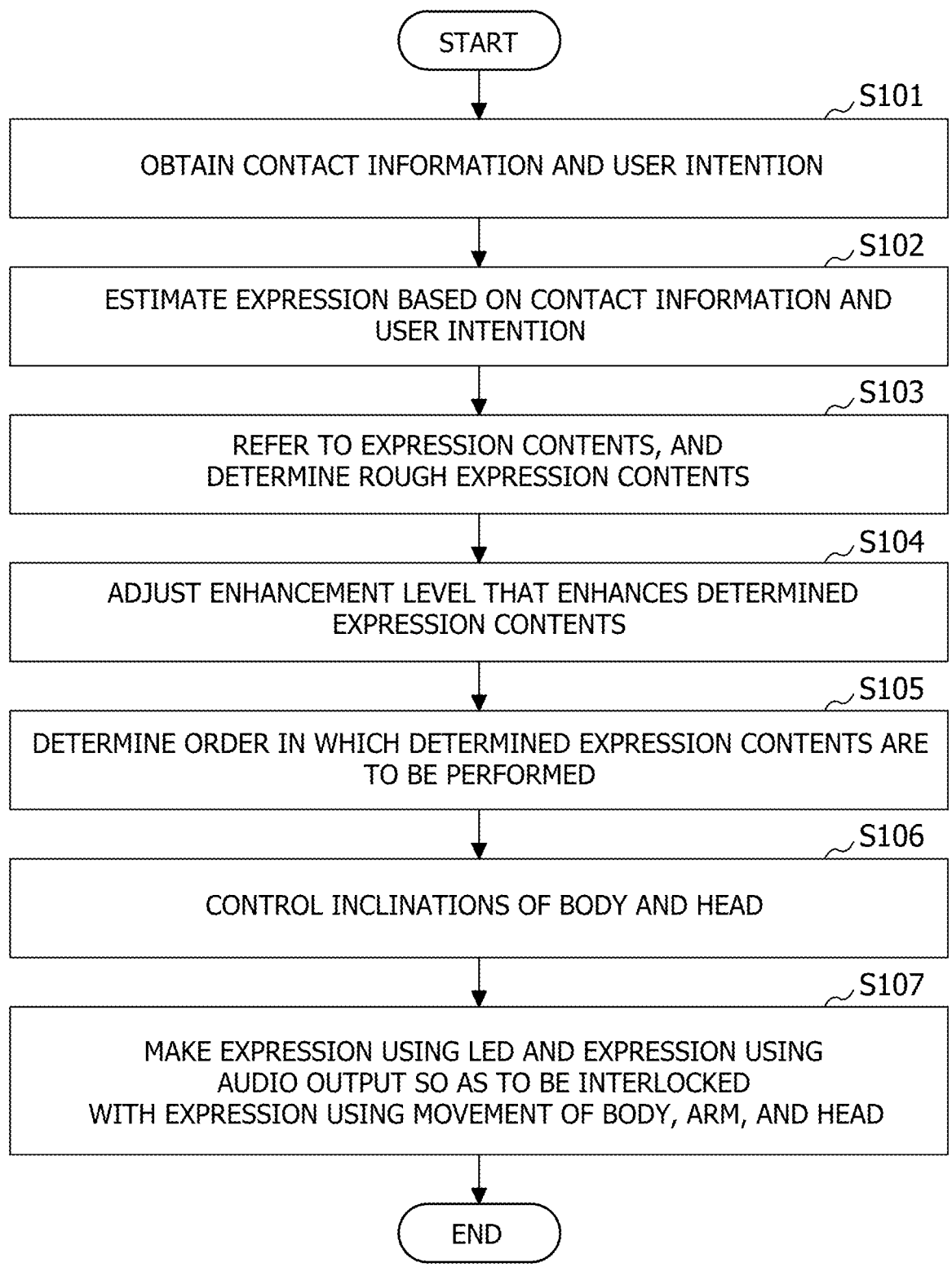
FIG. 15 is a flowchart of assistance in explaining an example of operation of the robot in one embodiment.

FIG. 15 is a flowchart of assistance in explaining an example of operation of the robot in one embodiment. The processing of steps S101 to S107 illustrated in FIG. 15 can be performed by the CPU 221 of the robot 2-1, for example. FIG. 15 illustrates the processing of the CPU 221 which processing corresponds to the functions illustrated in FIG. 4.

In step S101 in FIG. 15, the CPU 221 obtains contact information indicating contact between the user and the robot 2-1 and an intention of the user by the human and environment detecting unit 51. Specifically, when at least one of the back contact sensor 211, the head contact sensor 212, and the tablet 216 detects contact (that is, a touch) by the user, the contact detecting function 513 detects the contact (that is, the touch) of the user with the robot 2-1, and obtains contact information indicating the contact. In addition, when the user intention detecting function 514 detects the voice input of the user which voice input is detected by the microphone 213 or the manual input of the user which manual input is detected by the tablet 216, the user intention detecting function 514 obtains an intention (or a user distance) of the user.

In step S102, the CPU 221 estimates an interaction state according to the obtained contact information and the obtained intention of the user by the interaction state estimating function 521-1 of the expression determining unit 52-1, and estimates which expression is to be performed by the robot 2-1 by using the interaction state estimation table 241.

In step S103, the CPU 221 refers to a plurality of kinds of expression contents expressed by the robot 2-1, the plurality of kinds of expression contents being accumulated in the guidance behavior table 242 and the like by the expression accumulating function 522-1. In addition, in step S103, the CPU 221 determines, by the expression selecting function 523-1, rough expression contents of the robot 2-1 such as distant position indication, vicinity indication, or the like, including inclination angles of the robot 2-1, by referring to the active operation table 244 and the passive operation table 245 based on the interaction state estimated by the interaction state estimating function 521-1.

In step S104, the CPU 221 adjusts, by the enhancement level adjusting function 524-1 of the expression selecting function 523-1 an enhancement level that enhances the expression contents determined by the expression selecting function 523-1. For example, in a case where the expression contents are a bow, the body 201 is adjusted to an inclination corresponding to personal information detected by the personal information detecting function 512 by referring to the inclination setting table 246 based on the personal information.

In step S105, the CPU 221 determines, by the expression order determining function 525-1, order in which to perform the expression contents determined by the expression selecting function 523-1. For example, in a case where the expression contents are a bow, whether to incline the body 201 after bowing the head 203 or whether to bow the head 203 after inclining the body 201, for example, is determined by referring to the expression order table 247 based on the user distance detected by the user intention detecting function 514.

In step S106, the CPU 221 controls, by the inclination driving function 532 within the driving function 531 of the expression performing unit 53, the inclination of the body 201 and the inclination of the head 203 according to the determined order of the expression contents.

In step S107, the CPU 221 performs expression using the LED 233 by the light expressing function 533 and expression using audio output from the speaker 232 by the audio output function 534 so as to be interlocked with expression using movement of the body 201, the arms 202L and 202R, and the head 203 by the inclination driving function 532. The processing is then ended.

Next, with reference to FIGS. 16 to 18, description will be made of an example in which an expression such as an emotional expression or the like is performed by a non-verbal reaction including a gesture. When an expression such as an emotional expression or the like is performed by a non-verbal reaction including a gesture, audio output of buzzer sound or the like may be performed. However, in the present example, for the convenience of description, suppose that an expression such as an emotional expression or the like by language is not performed. In addition, when an expression such as an emotional expression or the like is performed by a non-verbal reaction including a gesture, light expression by the presence or absence of light emission and light emission color may be performed. At least one of expression such as an emotional expression or the like by audio output and expression such as an emotional expression or the like by light expression may be interlocked with a non-verbal reaction including a gesture.

Incidentally, the robot may function as a communication robot. In the case of a communication robot, it is needless to say that a well-known dialogue function that enables a dialogue with the user may be provided and that an expression such as an emotional expression or the like by language may be performed in parallel with the above-described non-verbal reaction.

Figure 16:
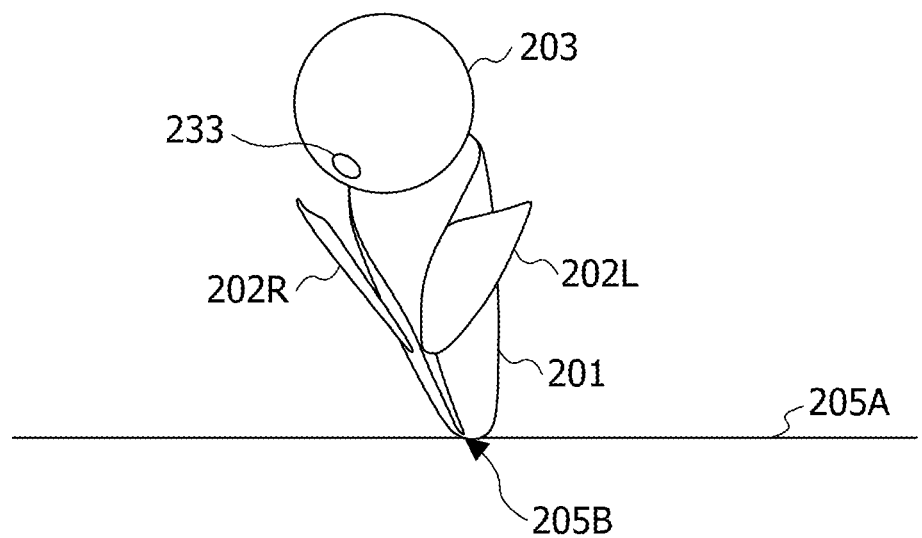
FIG. 16 is a perspective view illustrating an example of bowing of the robot.

FIG. 16 is a perspective view illustrating an example of bowing of the robot. As illustrated in the active operation table 244 of FIG. 10, when a bow is performed, the motors 231-1 to 231-3 of the robot 2-1 are driven such that a head tilt is downward, a head pan is to the front, the right arm is downward, the left arm is downward, a torso tilt is a forward inclination, and a torso pan is to the front. Thus, as illustrated in FIG. 16, the robot 2-1 can be made to perform an operation easily recognizable as a bow as viewed from the user without a complex configuration or complex control as in a humanoid robot. In addition, the enhancement level that enhances the expression contents can also be adjusted by using the inclination setting table 246 in FIG. 5. In this, case, the robot 2-1 can be made to perform a casual bow, a polite bow, or the like according to, the user, for example, by changing the inclination of the torso tilt according to the user information. Further, the order of expression by each part of the robot 2-1 can be determined according to the user distance by using the expression order table 247.

Figure 17:
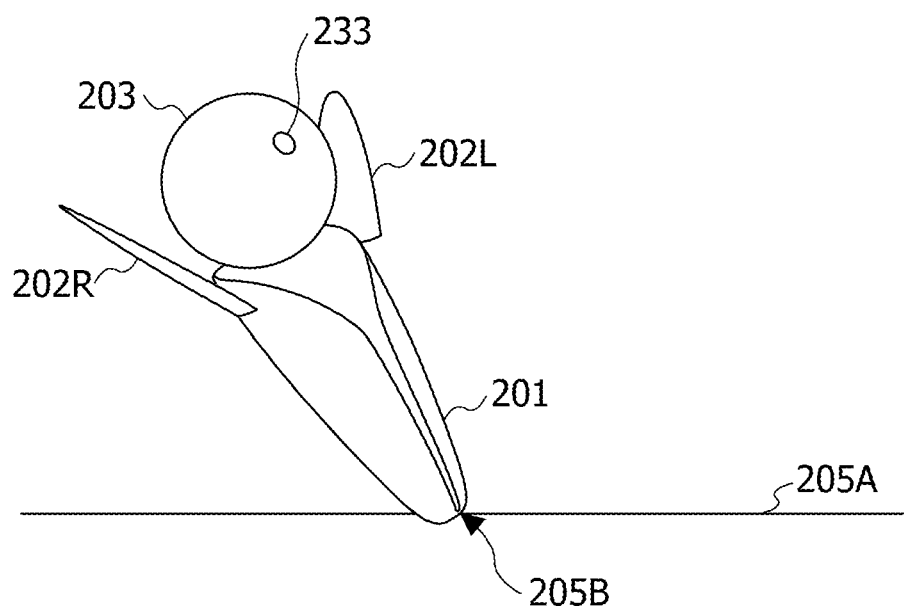
FIG. 17 is a perspective view illustrating an example of surprise of the robot.

FIG. 17 is a perspective view illustrating an example of surprise of the robot. As illustrated in the passive operation table 245 of FIG. 11, when surprise is expressed, the motors 231-1 to 231-3 of the robot 2-1 are driven such that a head tilt is upward, a head pan is absent (-), the right arm is upward, the left arm is upward, a torso tilt is bending backward, and a torso pan is absent (-). Also in this case, as a degree of surprise is increased, the inclination of the torso tilt, for example, may be increased by adjusting the enhancement level that enhances the expression contents. In addition, it is also possible to express surprise by turning on the red LED 233 using the LED expression table 601 of FIG. 13, or express surprise by performing audio output of high-pitched sound from the speaker 232 using the sound expression table 602 of FIG. 14.

Figure 18:
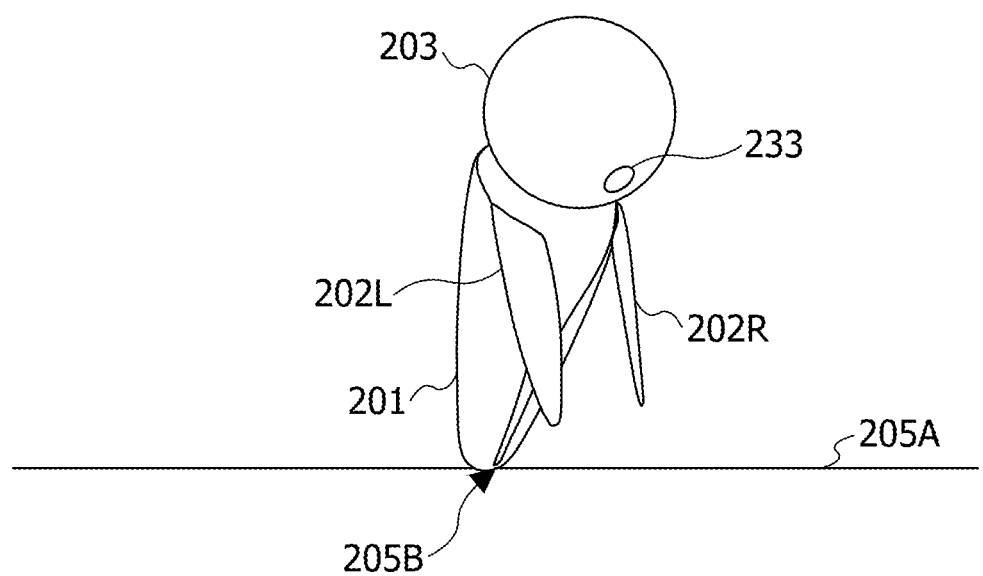
FIG. 18 is a perspective view illustrating an example of discouragement of the robot.

FIG. 18 is a perspective view illustrating an example of discouragement of the robot. As illustrated in the passive operation table 245 of FIG. 11, when discouragement is expressed, the motors 231-1 to 231-3 of the robot 2-1 are driven such that a head tilt is downward, a head pan is absent (-), the right arm is forward, the left arm is forward, a torso tilt is a forward inclination, and a torso pan is absent (-). Also in this case, as a degree of discouragement is increased, the inclination of the torso tilt, for example, may be increased by adjusting the enhancement level that enhances the expression contents. In addition, it is also possible to express discouragement by turning on, the blue LED 233 using the LED expression table 601 of FIG. 13, or express discouragement by performing audio output of low-pitched sound from the speaker 232 using the sound expression table 602 of FIG. 14.

Thus, the robot 2-1 can perform overaction particularly by the tilting of the body 201. An emotional expression easily recognized by the user can therefore be performed by combining the tilting of the body 201 with the moving up and down of the arms 202L and 202R and the panning and tilting of the head 203.

Incidentally, the robot 2-1 can also perform a guidance expression such as indicating a vicinity, indicating a distant position, or the like in addition to emotional expressions. Also in this case, overaction can be performed particularly by the tilting of the body 201. A guidance expression easily recognized by the user can therefore be performed by combining the tilting of the body 201 with the moving up and down of the arms 202L and 202R and the panning and tilting of the head 203. Thus, interaction with the user can be made smooth. For example, in a case of a guidance expression indicating a direction, the guidance expression accompanying overaction with the body 201 inclined draws attention of the user more easily and is recognized more easily than indicating the direction only by one arm 202L.

In addition, when the robot 2-1 performs a movement that makes an impression on the user at a time of performing an emotional expression or a guidance expression, it is possible to support provision of service from the robot 2-1. Further, when the robot 2-1 performs overaction, a psychological effect is also obtained such that the user feels more familiar with the robot 2-1. For example, even in, a case of a user distant from the robot 2-1, when the body 201 of the robot 2-1 is inclined toward the user, interaction with affinities is made possible between the user and the robot 2-1 as in a case where a psychological expression in a psychological expression scene is a high affinity in the psychological behavior table 243 included in the interaction state estimation table 241 of FIG. 9 in the present example.

Figure 19:
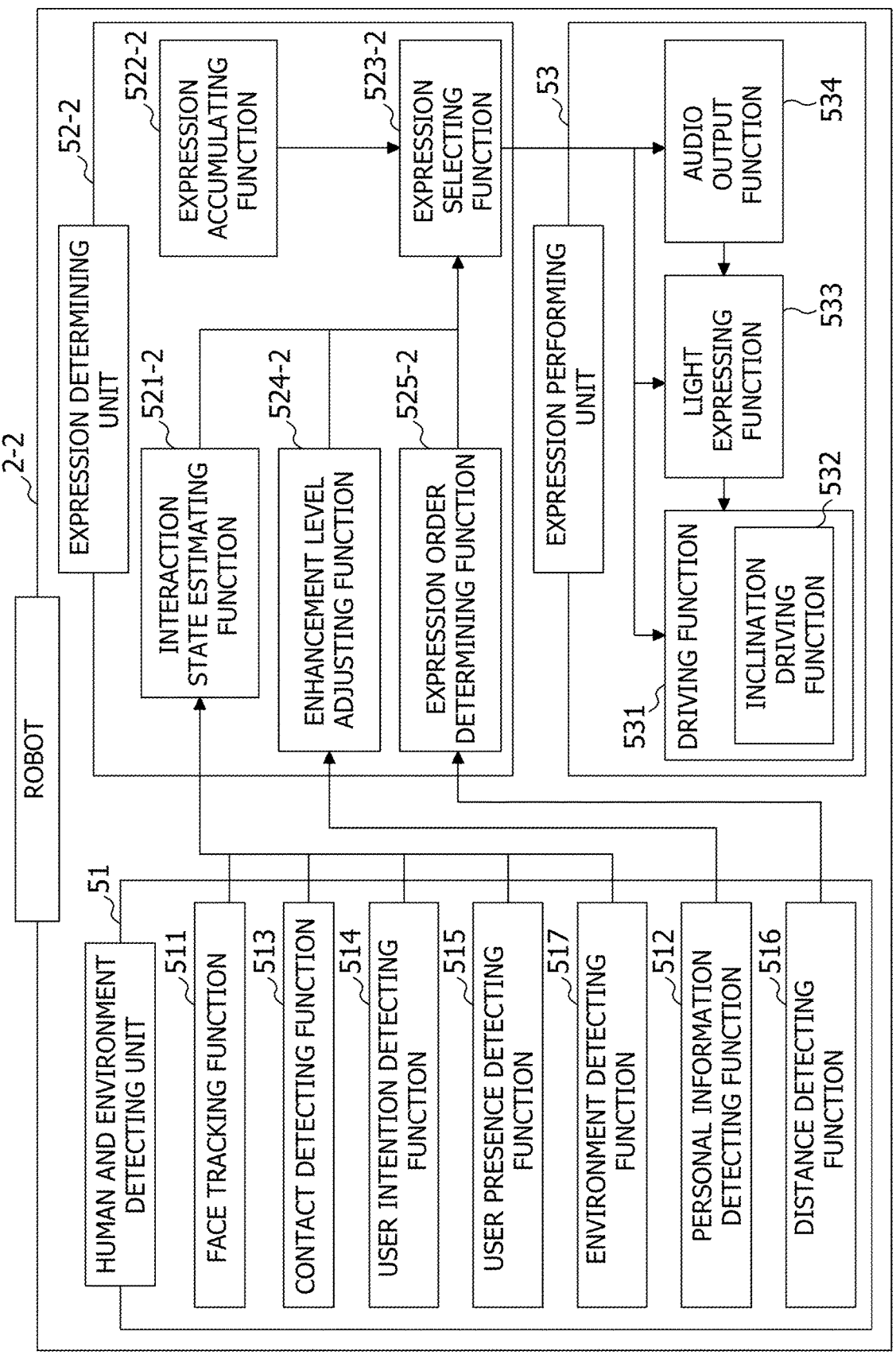
FIG. 19 is a functional block diagram illustrating a second example of the functional configuration of the robot.

FIG. 19 is a functional, block diagram illustrating a second example of the functional configuration of the robot. In FIG. 19, the same parts as in FIG. 4 are identified by the same reference signs, and description thereof will be omitted. An expression determining unit 52-2 of a robot 2-2 illustrated in FIG. 19 has an interaction state estimating function 521-2, an expression accumulating function 522-2, an expression selecting function 523-2, an enhancement level adjusting function 524-2, and an expression order determining function 525-2.

The interaction state estimating function 521-2 is a function of the CPU 221 which function estimates an interaction state between the robot 2-2 and the user by using the interaction state estimation table 241, for example, and determines expression contents according to information detected by the face tracking function 511, the contact detecting function 513, the user intention detecting function 514, the user presence detecting function 515, and the environment detecting function 517 of the human and environment detecting unit 51. The expression accumulating function 522-2 is a function of the CPU 221 which function accumulates a plurality of kinds of expression contents expressed by the robot 2-2, and includes expressions such as emotional expressions and the like by non-verbal reactions including gestures.

The enhancement level adjusting function 524-2 is a function of the CPU 221 which function adjusts an enhancement level that enhances the expression contents determined by the expression selecting function 523-2 according to personal information detected by the personal information detecting function 512 of the human and environment detecting unit 51. For example, in a case where the expression contents are a bow, the body 201 is adjusted to an inclination corresponding to the personal information detected by the personal information detecting function 512 by referring to the inclination setting table 246 based on the personal information.

The expression order determining function 525-2 is a function of the CPU 221 which function determines order in which to perform the expression contents determined by the expression selecting function 523-2 according to distance information detected by the distance detecting function 516 of the human and environment detecting unit 51. For example, in a case where the expression contents are a bow, whether to incline the body 201 after bowing the head 203 or whether to bow the head 203 after inclining the body 201, for example, is determined by referring to the expression order table 247 based on a user distance detected by the user intention detecting function 514.

The expression selecting function 523-2 is a function of the CPU 221 which function determines rough expression contents of the robot 2-2, including inclination angles of the robot 2-2, from the plurality of kinds of expression contents accumulated by the expression accumulating function 522-2 by referring to the active operation table 244 and the passive operation table 245 based on the interaction state estimated by the interaction state estimating function 521-2.

According to each of the foregoing embodiments, expressions such as many kinds of emotional expressions and the like can be performed by gestures with a low degree of freedom of operation.

Overaction can be performed particularly by the tilting of the body. An expression such as an emotional expression or the like that the user easily recognizes can therefore be performed by combining the tilting of the body with the moving up and down of the arms and the panning and tilting of the head.

In addition, the robot has a relatively simple configuration, and can therefore be reduced in size and cost.

The disclosed robot has been described above based on embodiments thereof. However, it is needless to say that the present invention is not limited to the foregoing embodiments, but that various modifications and improvements can be made within the scope of the present invention.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be, made hereto without departing from the spirit and scope of the invention.

What is claimed is:

1. A robot for performing an expression by a non-verbal reaction, the robot comprising:
    a body including a lower part configured to pan and tilt with respect to a support point coupled to a placement surface;
    a pair of arms provided to side parts of the body configured to move up and down;
    a head provided to an upper part of the body configured to pan and tilt; and
    a memory storing information used to control the non-verbal reaction, wherein
    the non-verbal reaction includes a combination of the tilting and the panning of the body with respect to the support point and movement of the pair of arms or the head or any combination thereof, and
    wherein the body pans within a range of movement of 180 degrees and tilts within a range of movement of 30 degrees, and the head pans within a range of movement of 300 degrees and tilts within a range of movement of 60 degrees.

2. The robot according to claim 1, further comprising:
    a light source provided to the head, wherein
    the non-verbal reaction is a further combination with turning on or off of the light source.

3. The robot according to claim 2, wherein
    the light source includes light sources of a plurality of different colors, and
    the non-verbal reaction is a further combination with turning on or off of the light sources of the plurality of different colors.

4. The robot according to claim 1, further comprising:
    a speaker, wherein
    the non-verbal reaction is a further combination with audio output from the speaker.

5. The robot according to claim 1, further comprising:
at least one sensor configured to obtain information regarding an environment of the robot in order to interact with visitors within the environment;
the memory further storing information regarding the visitors within the environment and operational information for the robot; and
a Central Processing Unit (CPU) coupled to the at least one sensor and the memory, the CPU being configured to:
detect detection information including contact information indicating contact between a user and the robot and an intention of the user;
accumulate driving patterns of the body, the pair of arms, and the head for performing the expression; and
determine a driving pattern according to the detection information, and control the body, the pair of arms, and the head by the determined driving pattern.

6. The robot according to claim 5, wherein the CPU is further configured to:
estimate an interaction state between the robot and the user according to the detection information; and
determine expression contents used to control the body, the pair of arms, and the head by the driving pattern corresponding to the determined expression contents.

7. The robot according to claim 5, wherein
the CPU is further configured to adjust an enhancement level that enhances the expression based on the determined driving pattern, and controls the body so as to increase inclination of the body with respect to the placement surface according to the enhancement level.

8. The robot according to claim 5, wherein
the CPU is further configured to determine a determining order in which to perform the expression based on the determined driving pattern, and control the body, the pair of arms, and the head in the determined order.

9. The robot according to claim 5, wherein
the at least one sensor includes
a contact sensor or a tablet or any combination thereof that detects the contact information, and
a microphone or the tablet or any combination thereof that detects the intention of the user.

10. The robot according to claim 9, wherein
the at least one sensor further includes a human sensing sensor, a camera, a distance measuring sensor or a temperature sensor or any combination thereof.

11. The robot according to claim 5, further comprising:
a box-shaped base including the placement surface, wherein
the CPU is disposed within the box-shaped base.

12. The robot according to claim 1, further comprising:
a communication control device that receives identification information transmitted from a tag.

13. The robot according to claim 1 further comprising a transceiver configured to receive communication including a beacon ID, the beacon ID being associated with a visitor and stored in a memory, and
wherein the movement of the robot varies based on the received beacon ID.

* * * * *